United States Patent [19]
Linder et al.

[11] 4,380,900
[45] Apr. 26, 1983

[54] APPARATUS FOR REMOVING SOLID COMPONENTS FROM THE EXHAUST GAS OF INTERNAL COMBUSTION ENGINES, IN PARTICULAR SOOT COMPONENTS

[75] Inventors: Ernst Linder, Mühlacker; Rudolf Babitzka, Kirchberg; Johannes Brettschneider, Ludwigsburg; Wilhelm Polach, Möglingen; Wolf Wessel, Oberriexingen; Gerhard Stumpp, Stuttgart, all of Fed. Rep. of Germany

[73] Assignee: Robert Bosch GmbH, Stuttgart, Fed. Rep. of Germany

[21] Appl. No.: 267,322

[22] Filed: May 26, 1981

[30] Foreign Application Priority Data

May 24, 1980 [DE] Fed. Rep. of Germany ....... 3019991

[51] Int. Cl.³ .............................................. F01M 3/00
[52] U.S. Cl. ...................... 60/275; 55/127; 55/150; 60/278; 60/311; 55/459 B; 55/DIG. 30; 55/131
[58] Field of Search .......... 55/2.6, 124–127, 55/131, 150–152, 459 B, DIG. 30; 60/278, 275, 60/311; 210/243

[56] References Cited

U.S. PATENT DOCUMENTS

| 2,142,129 | 1/1939 | Hoss et al. | 55/131 |
| 3,157,479 | 11/1964 | Boles | 60/275 |
| 3,296,807 | 1/1967 | Fekete | 55/17 |
| 3,439,476 | 4/1969 | Knight | 55/DIG. 30 |
| 3,440,800 | 4/1969 | Messen-Jaschin | 55/127 |
| 4,244,708 | 1/1981 | Bielefeldt | 55/459 R |
| 4,304,096 | 12/1981 | Liu et al. | 55/DIG. 30 |
| 4,309,199 | 1/1982 | Suzuki | 55/152 |

FOREIGN PATENT DOCUMENTS

| 2833481 | 2/1980 | Fed. Rep. of Germany | 60/311 |
| 46-1678 | 7/1971 | Japan | 55/127 |
| 133472 | 10/1973 | United Kingdom | 60/311 |

Primary Examiner—Bernard Nozick
Attorney, Agent, or Firm—Edwin E. Greigg

[57] ABSTRACT

An apparatus is described for the removal of solid components from the exhaust gas of internal combustion engines, in particular for the removal of soot components from the exhaust gases of self-igniting combustion engines. Under the influence of electrostatic fields, the solid components are diverted and carried to a fresh-air current flowing toward the intake side of the engine. This recirculation of the solid components may be effected either by means of the recirculation of a partial flow of the exhaust gas which has been enriched with solid components, in which case the solid components are deflected into this partial flow in an electrostatic field, or these solid components may be guided into the fresh-air current aspirated by the engine, in this case with the cooperation of a mechanical transport means and electrostatic bonding forces.

4 Claims, 4 Drawing Figures

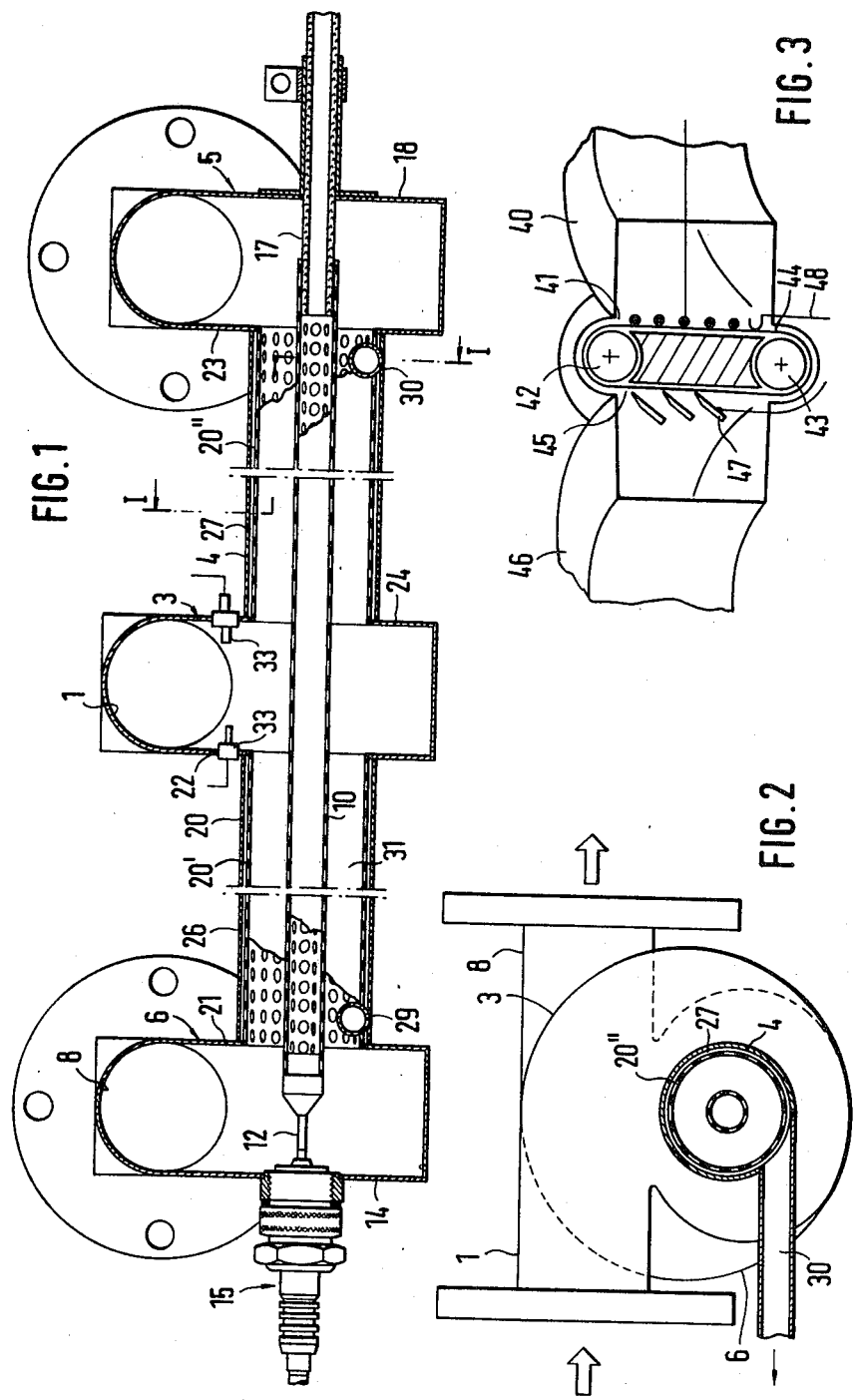

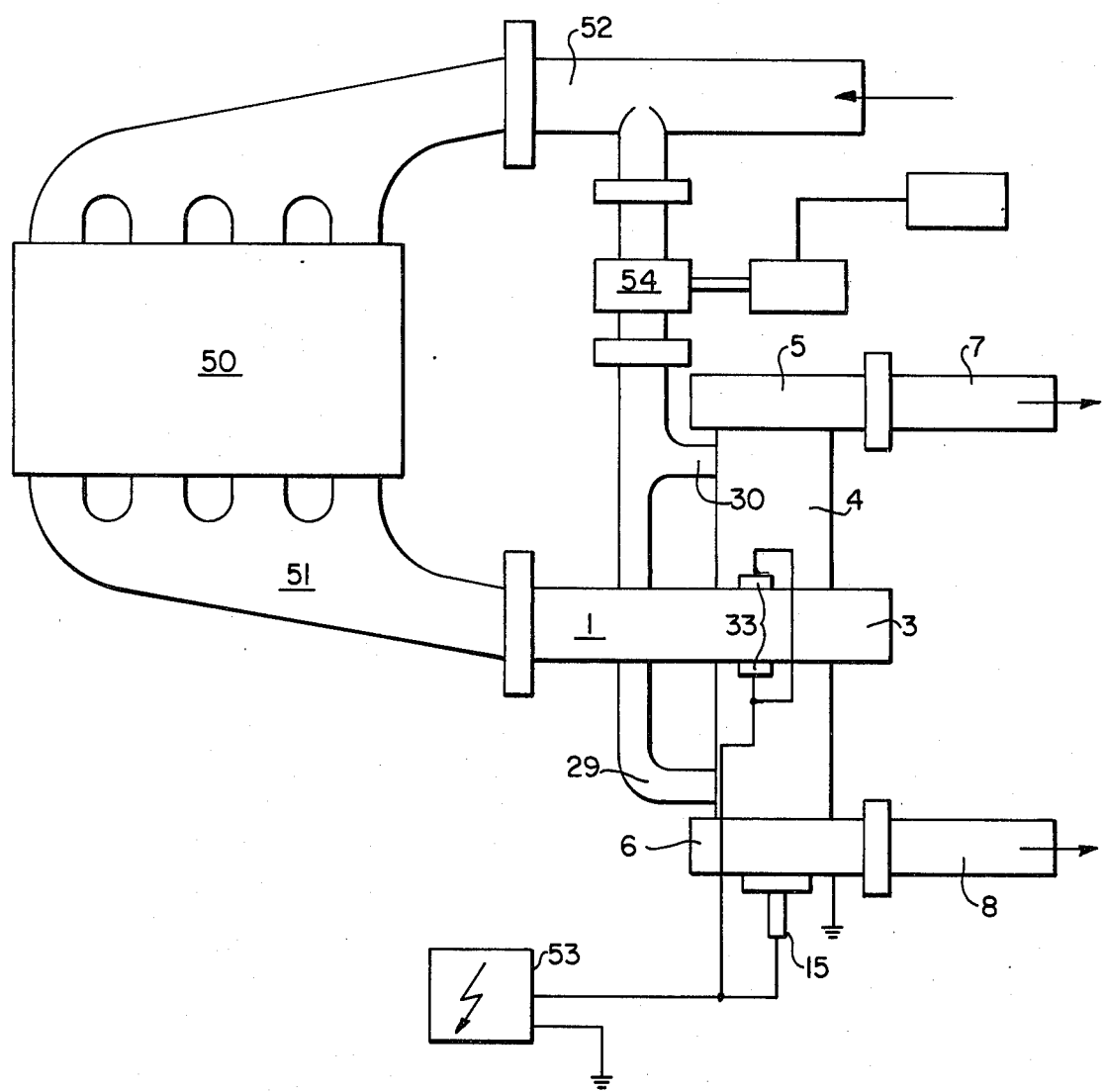

APPARATUS FOR REMOVING SOLID COMPONENTS FROM THE EXHAUST GAS OF INTERNAL COMBUSTION ENGINES, IN PARTICULAR SOOT COMPONENTS

BACKGROUND OF THE INVENTION

The invention is based on a apparatus for the removal of solid components from the exhaust gas of internal combustion engines. Filtering soot from gas flows with electrostatic filters is known from German Offenlegungsschrift 1 557 157. This method attains good filtering results even in the case of the smallest soil particles. The precondition for a high degree of cleansing with the aid of such filters is a low flow velocity on the part of the medium to be cleansed. In the case of soot precipitation, which is particularly of interest in self-igniting internal combustion engines, this results in very large flow cross-sections, the consequence of which is that the electrostatic filter becomes so large that it can be accommodated only very poorly in a motor vehicle driven by an engine. In particular, the locations where such a filter can be accommodated are relatively distant from the point where the exhaust gas exits from the combustion chamber. At such locations the exhaust gas as it arrives has already been greatly cooled down, so that water condenses from it. Together with the soot which has been precipitated out, this causes shunting which reduces the effectiveness of the electrostatic filter. A further problem in the known apparatus is the removal of the precipitated soot. In the above known apparatus, a gas-permeable filter cartridge is provided as the intercepting filter. This cartridge must be changed at relatively brief intervals. A cyclone filter which is also generally provided and precedes the intercepting filter must also be emptied at regular intervals. Satisfactory functioning accordingly requires complicated monitoring apparatus for the system.

OBJECT AND SUMMARY OF THE INVENTION

The apparatus according to the invention, has the advantage over the prior art that the soot components precipitating out of the exhaust gas, especially in self-igniting internal combustion engines, are deflected from the primary flow of the exhaust gas by the effect of the electrostatic field and by centrifugal force and are directed back to the combustion chamber of the internal combustion engine. In this manner, a complicated monitoring device for conventionally known filters as well as the expensive servicing of the same can be eliminated.

As a result of the characteristics disclosed, advantageous modifications of the solution disclosed are possible. In particular, advantageous apparatuses are disclosed for performing the method set forth herein.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 1 shows a first cross-sectional exemplary embodiment of the invention, in which the soot being precipitated out of the exhaust gas is enriched with the aid of tubular electrodes in partial currents of the exhaust gas;

FIG. 2 is a section taken on line I—I through the exemplary embodiment of FIG. 1; and FIG. 3 shows a second exemplary embodiment of the invention, in which the soot is first precipitated out electrostatically and is then released in a fresh-air current flowing to the internal combustion engine.

FIG. 4 illustrates an engine with an intake and exhaust connected to the apparatus for removing solid components from the exhaust gases.

DESCRIPTION OF THE PREFERRED EMBODIMENTS

The exhaust gas emitted to the exhaust manifold system by an internal combustion engine 50, having an intake manifold 52 and an exhaust manifold 51 is delivered via a connecting line 1 to the apparatus according to the invention, which may be described as a soot diverter. The connecting line discharges into a spiral housing 3, which is adjoined at either side, coaxially with the axis of the spiral embodied by the spiral housing 3, by a tubular housing 4. At either end of the tubular housing, a second and a third spiral housing 5 and 6 are attached in the same manner as the first spiral housing 3. The second and third spiral housings 5 and 6 open up in the opposite direction, in the form of discharge spirals. A first discharge line 7 and a second discharge line 8 lead from the spiral housings, 5 and 6, respectively, to the outlet of the exhaust gas system which is not shown in detail.

A perforated tube, embodying the first electrode 10, is disposed coaxially in the interior of the tubular housing 4. This tube is closed at its first end, located in the vicinity of the third spiral housing 6, and there communicates via a rod-like electrode 12 with the electrode of a spark plug 15 inserted into the outer axial limiting wall 14 of the third spiral housing 6. The supply voltage is delivered to this spark plug 15 by a high voltage source 53. On the other end, the first electrode 10 merges with the ceramic tube 17 which is carried toward the outside through the outer axial limiting wall 18 of the second spiral housing 5 and is there connected with an exhaust recirculation line, not shown in detail, which leads to the intake tube of the engine.

A second (ground) electrode 20 is furthermore disposed inside the tubular housing 4 and is likewise embodied as a perforated tube including the first electrode 10 and disposed coaxially with the tubular housing 4 or the first electrode 10. The second electrode 20 comprises two partial elements 20' and 20". The first partial element 20' is located between the inner, axial limiting wall 21 of the third spiral housing 6 and the opposite axial limiting wall 22 of the first spiral housing 3. In an analagous fashion, the second portion of the ground electrode 20" is located between the inner, axial limiting wall 23 of the second spiral housing 5 and the axial limiting wall 24 of the first spiral housing 3 disposed opposite thereto. The partial tubes 20' and 20" of the second electrode 20 are firmly connected with these limiting walls, and the inner diameter of the second electrode represents the free flow-through cross section between the first spiral housing 3 on the one hand and the second and third spiral housing 5 and 6, respectively, on the other. A first annular chamber is disposed between the second electrode 20 and the tubular housing, this annular chamber being subdivided in accordance with the parts of the second electrode 20 into a first axially closed partial chamber 26 and a second axially closed partial chamber 27.

In FIG. 2 a section ia shown taken through the tubular housing in accordance with the line I—I. The abovementioned partial chamber 27 may be seen in this figure located between the second electrode 20" and the tubular housing 4. A second exhaust recirculation line 29 and a third exhaust recirculation line 30, respectively, lead away from this tubular housing at the respective outermost axial end of the partial chambers 26 and 27 adjacent to the second and third spiral housing 5 and 6, respectively. In the same manner as the exhaust recirculation line attached to the ceramic tube 17, these exhaust recirculation lines 29 and 30 lead back to the intake side of the engine 52.

The apparatus functions as follows.

During operation, a voltage is applied relative to ground to the electrode of the spark plug 15. As a result, a high-voltage field is formed between the first electrode 10 and the second electrode 20 over the entire length of these elements. The exhaust gas arriving from the exhaust manifold system is delivered through the connecting line 1 and set into rotational motion via the spiral housing 3. The inflowing, rotating exhaust gas is then distributed to the left and the right, as viewed in the drawing, in the second annular chamber 31 formed between the first electrode 10 and the second electrode 20. Naturally, this entire annular chamber 31 is exposed to the voltage field. The exhaust gas can be carried back to the outward side of the exhaust gas system via the spiral housing 5 and 6, the spiral embodiment of the housing 5 and 6 favoring the gas rotation in the second annular chamber and favoring the transport of the exhaust gas back to the outlet side. Dust and soot are ionized in the electrical field and diverted in the direction of a positive first electrode 10 or negative second electrode 20. The perforation of the electrodes permits the exhaust gases, carrying the soot or dust particles, to pass therethrough. After passage through the electrodes, the exhaust gas is collected in the partial chamber 26 and 27 or in the interior of the first electrode. As a result of the rotational movement of the exhaust gas about the longitudinal axis of the housing 4, a spin is imparted to the exhaust gas which during the dwell time in the second annular 31 permits a separation of the soot. This separation is also effected under the influence of centrifugal force and is reinforced by the electrostatic field. On the other hand, precipitation at the electrodes is prevented by this spin. The soot, which is precipitating out under the influence of centrifugal force and is practically redeposited at the second electrode 20, is also prevented from flowing back into the gas current in the interior of the second annular chamber. In order to attain the longest possible dwell time of the exhaust gas inside the housing 20, the volume is dimensioned such that it encompasses the exhaust gas volume of at least one cylinder charge of the associated engine. Periodic gas exchange procedures take place, and from time to time it is possible to eliminate the axial movement components of the exhaust gas current. These flow conditions reinforce the separation of the soot from the exhaust gas under the influence of the electrostatic field.

The exhaust gases reaching the partial chambers 26 and 27, which are heavily loaded with soot particles are delivered back to the intake system of the engine via the exhaust recirculation lines 29 and 30. This is effected in the same manner with the exhaust gas flowing out the interior of the first electrode 10, which is also greatly enriched with solid components. The exhaust gas flowing out of the second annular chamber 31 into the spiral housings 5 and 6, in contrast, is low in soil particles and is delivered to the outlet of the exhaust system.

The disposition of the insulation of the first electrode 10, which is subject to high voltage, is selected in an advantageous manner such that the insulating bodies at the two ends of the electrodes are respectively exposed only to the exhaust gas which has been cleansed under the influence of the electrostatic field. Thus, the danger of exposure to soot and the associated vulnerability to shunting is reduced. In comparison to soot precipitating filters, an apparatus is attained with the embodiment according to the invention or with the method according to the invention which functions well with relatively small flow cross-sections, so that the soot diverter can be disposed directly behind the engine outlet. The exhaust gas reaches the soot diverter at relatively high temperatures, which likewise reduces the vulnerability to shunting caused by soot deposits or condensation of water. The flow resistance in the soot diverter is very low compared to conventional filters; the structure is simple and relatively invulnerable to malfunction; and the removal of precipitated soot components in a maintenance cycle is no longer necessary.

In an advantageous and proved embodiment, electrodes can be disposed in the vicinity of the spiral housing and the connecting line for the purpose of pre-ionizing the exhaust gases. The soot components are ionized by means of corona discharging. Ionization electrode 33 of this kind are indicated in the drawing by broken lines. They are supplied with voltage from a high-voltage source 53 in the same manner as is the first electrode 10.

FIG. 4 illustrates the connection between a combustion engine 50 and the apparatus for removing solid components from the exhaust gas. The engine exhaust 51 is secured to the soot remover and the exhaust return 29 and 30 are shown connected to the intake manifold 52. An exhaust return control valve 54, such as well known in the prior art, has been shown to control the return exhaust in accordance with engine operating parameters as well known in the art. The high voltage source for the electrodes has been shown as 53.

In the exemplary embodiment of FIG. 3, a line 40 carrying exhaust gas is shown which leads from an exhaust manifold system, not shown, of an internal combustion engine to the exhaust outlet of the exhaust gas system. An opening 41 is provided in the wall of this line 40 carrying exhaust gas, and a conveyor belt 44 revolving about a first roller 42 and a second roller 43, which is driven in a suitable manner, travels past this opening 41. After the deflection at one of the rollers, the conveyor belt travels past an opening 45 of a second line 46 which carries fresh air and leads back to the intake side of the engine. On this side of the conveyor belt, deflectors 47 are disposed in the vicinity of the opening 45. With the aid of these deflectors 47 it is possible to deflect solid components deposited on the conveyor belt 44 and divert them to the air current in line 46. The conveyor belt is supported in an insulated fashion and is exposed to high voltage via a brush or scraper 48, so that exhaust gas impurities, which may have been ionized with the aid of a pre-ionizing device, are deposited on the conveyor belt in the vicinity of the opening 41. This revolving belt is then cleansed once again in the vicinity of the opening 45, in order to be able to accept new soot particles.

Instead of the conveyor belt, a belt having steel bristles can also be used, the bristles being exposed to the flow of exhaust gas and filtering out soot components. On the side carrying air, the soot is then shaken off the the filter bristles, which may be effected with the aid of an ultrasonic generator, for example. This application has the further advantage that the openings 41 and 45 can be sealed off by the bristle belt.

The foregoing relates to preferred exemplary embodiments of the invention and it will be understood that numerous other embodiments and variants thereof are possible within the spirit and scope of the invention, the latter being defined by the appended claims.

What is claimed and desired to be secured by Letters Patent of the United States is:

1. An apparatus for the removal of solid components from an exhaust gas system of an internal combustion engine, comprising an intake system, a spiral housing, a connecting line connecting said exhaust gas system with said spiral housing to provide an inlet for said apparatus, a tubular housing having an axial center, a circumferential wall and end portions, said tubular housing being connected to said spiral housing, a first electrode extending longitudinally along said axial center of said housing and insulated therefrom, a perforated second electrode surrounding said first electrode, a first annular chamber between said wall and said second electrode within said tubular housing, at least one exhaust recirculation line extending from said first annular chamber to said intake system of said engine to provide one outlet, a second annular chamber disposed between said electrodes, said second annular chamber being connected with said spiral housing to receive exhaust gases discharged from said exhaust gas system, said spiral housing discharging tangentially into said second annular chamber, and a discharge line leading tangentially from said second annular chamber back to said exhaust system to provide a second outlet. with said spiral housing to receive exhaust gases discharged from said exhaust gas system, said spiral housing discharging tangentially into said second annular chamber, and a discharge line leading tangentially from said second annular chamber back to said exhaust system to provide a second outlet.

2. An apparatus as defined by claim 1, characterized in that said first electrode comprises a perforated tube having a free end which is associated with an insulated tube, said insulated tube being connected via an exhaust recirculation line and of said at least one exhaust recirculation line with said intake side of said engine.

3. An apparatus as defined by claim 2, characterized in that said housing has an exhaust gas inlet and ionizing electrodes are provided in close proximity thereto.

4. An apparatus as defined by claim 1, characterized in that said connecting line discharges into said housing medially of the length thereof and further that in proximity to said end portions of said housing first and second discharge lines lead away from said second annular chamber and that said first annular chamber is divided by an inlet location of said connecting line into a first partial chamber and a second partial chamber, a second exhaust gas recirculation line and a third exhaust gas recirculation line of said at least one exhaust recirculation line leading away from the respective outermost ends of the partial chambers.

* * * * *